United States Patent
Kondou et al.

(10) Patent No.: US 7,623,523 B2
(45) Date of Patent: Nov. 24, 2009

(54) SYSTEM FOR CONNECTING INFORMATION PROCESSING DEVICES ASSOCIATED WITH IP TELEPHONES

(75) Inventors: Youichi Kondou, Kawasaki (JP); Yasushi Hara, Kawasaki (JP); Toshiya Miyazaki, Kawasaki (JP); Satoshi Kikuchi, Kawasaki (JP); Kazuyuki Takaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 515 days.

(21) Appl. No.: 11/227,209

(22) Filed: Sep. 16, 2005

(65) Prior Publication Data

US 2006/0256790 A1 Nov. 16, 2006

(30) Foreign Application Priority Data

May 13, 2005 (JP) ............................. 2005-140695

(51) Int. Cl.
*H04L 12/28* (2006.01)
*H04L 12/56* (2006.01)
*H04J 3/24* (2006.01)

(52) U.S. Cl. .............................. 370/395.21; 370/395.3; 370/475

(58) Field of Classification Search ................. 370/392, 370/338
See application file for complete search history.

(56) References Cited

U.S. PATENT DOCUMENTS 6,985,961 B1 * 1/2006 Ramsayer et al. ........... 709/238
7,403,744 B2 * 7/2008 Bridgelall .................. 455/41.2
2004/0062230 A1 * 4/2004 Taylor et al. ................. 370/352
2006/0007900 A1 * 1/2006 Sylvain ...................... 370/338
2006/0026288 A1 * 2/2006 Acharya et al. ............. 709/227
2006/0121924 A1 * 6/2006 Rengaraju et al. ........... 455/518

FOREIGN PATENT DOCUMENTS

JP 2003-069602 A 3/2003
JP 2003-283670 A 10/2003

* cited by examiner

*Primary Examiner*—Daniel J. Ryman
*Assistant Examiner*—Cassandra Decker
(74) *Attorney, Agent, or Firm*—Arent Fox LLP (57) ABSTRACT

An information processing apparatus for call control and management stores IP addresses of first and second IP telephones and first and second information processing devices associated with the respective IP telephones. When the information processing apparatus receives from the first IP telephone a message requesting to establish a session with the second IP telephone, the information processing apparatus sends, to the second IP telephone using the IP address of the second IP telephone, a message requesting to establish a session with the first IP telephone, to thereby establish a session between the first and second IP telephones. When a session is established between the first and second IP telephones, the information processing apparatus sends the IP address of the second information processing device to the first information processing device using the IP address of the first information processing device and sends the IP address of the first information processing device to the second information processing device using the IP address of the second information processing device.

16 Claims, 10 Drawing Sheets

| REGISTERED NAMES | IP ADDRESSES OF IP TELEPHONES | SESSION STATUSES | TYPES OF INFO PROC DEVICES | IP ADDRESSES OF INFO PROC DEVICES | AVAILABLE APPLICATIONS | DISPLAY RESOLUTIONS | DETERMINATION CONDITIONS, PRIORITIES |
|---|---|---|---|---|---|---|---|
| IPtel-1 | 10.10.10.1 | ESTABLISHED | PC | 10.10.10.2 | App1 | 800x600 | USE IF OTHER PARTY IS PC |
| | | | PDA | 10.10.10.3 | App2 | 320x240 | USE IF OTHER PARTY IS PDA |
| | | | ... | ... | ... | ... | |
| IPtel-2 | 20.20.20.1 | ESTABLISHED | PDA | 20.20.20.2 | App3 | 480x640 | |
| | | | ... | ... | ... | ... | |
| IPtel-3 | 30.30.30.1 | RELEASED | PC | 30.30.30.3 | App1 | 1024x768 | 1 |
| | | | ... | ... | ... | ... | 2 |

SYSTEM FOR CONNECTING INFORMATION PROCESSING DEVICES ASSOCIATED WITH IP TELEPHONES

FIELD OF THE INVENTION

The present invention relates generally to connection of IP telephones over an IP network, and more particularly to a system comprising IP telephones and information processing devices associated with the IP telephones, for establishing a IP telephone session between the IP telephones over an IP network and then establishing a P2P (peer-to-peer) session between the information processing devices over the IP network via a call control and management server.

BACKGROUND OF THE INVENTION

The known VoIP (Voice over IP) communication technology allows IP (Internet Protocol) telephone communications between two IP telephones over the Internet.

Japanese Unexamined Patent Publication JP 2003-69602-A describes an IP telephone system. In this system, an IP telephone client A sends a call origination control packet containing an IP telephone address of an IP telephone client B. Upon receipt of this packet, an IP telephone server A performs a procedure for holding an unfixed IP address of the client A until the end of the IP telephone communication, and sends the packet to an IP telephone server B on the client B side. Upon receipt of this packet, the server B performs a procedure for holding an unfixed IP address of the client B until the end of the IP telephone communication, and sends the packet to the client B. Upon receipt of this packet, the client B notifies a user of the incoming call in a predetermined form. If an instruction is provided by the user for responding to the incoming call, the client B sends, to the client A, a response packet for responding to the call origination control packet.

Japanese Unexamined Patent Publication JP 2003-283670-A describes a VoIP contact center system which integrates systems for audio and data. In this system, an audio service apparatus and a data service apparatus are connected to a switching system installed only in a main center, and received audio is converted into the IP format for integration with data to provide to a satellite center and a residential satellite center, to thereby provide a service for allowing a customer to listen to audio explanation while the customer and an operator watch the same Web screen.

The IP telephone performs call control via the call control and management server on the network. For the call control, SIP (Session Initiation Protocol), H.323 or the like is used as a communication protocol. For initiating a call, the IP telephone typically establishes a session with another IP telephone via the call control and management server having a SIP server function. After the session is established, the IP telephone performs P2P (peer-to-peer) audio packet exchange with the other IP telephone.

SUMMARY OF THE INVENTION

In accordance with an aspect of the present invention, a system comprises an information processing apparatus for call control and management, first and second IP telephones, a first information processing device associated with the first IP telephone, and a second information processing device associated with the second IP telephone, which are adapted to connect to an IP network. The call control and management information processing apparatus stores IP addresses of the first and second IP telephones and of the first and second information processing devices. When the call control and management information processing apparatus receives from the first IP telephone a message requesting to establish a session with the second IP telephone, the call control and management information processing apparatus sends, to the second IP telephone using the IP address of the second IP telephone, a message requesting to establish a session with the first IP telephone, to thereby establish a session between the first and second IP telephones. When a session is established between the first and second IP telephones, the call control and management information processing apparatus sends the IP address of the second information processing device to the first information processing device using the IP address of the first information processing device and sends the IP address of the first information processing device to the second information processing device using the IP address of the second information processing device.

In accordance with another aspect of the invention, an IP telephone adapted to connect to an IP network, comprises: a unit, in response to receipt of an input of an instruction for registering an IP address of a particular information processing device associated with the IP telephone, for obtaining the IP address of the particular information processing device associated with the IP telephone; and a unit for connecting via the IP network to an information processing apparatus for call control and management and then sending, to the call control and management information processing apparatus, the IP address of the particular information processing device to thereby register, with the call control and management information processing apparatus, the IP address of the particular information processing device in association with a user identifier and an IP address of the IP telephone.

In accordance with a further aspect of the invention, an information processing apparatus for call control and management establishes a session between first and second IP telephones connected to each other via an IP network and establishes a session between a first information processing device associated with the first IP telephone and a second information processing device associated with the second IP telephone connected to each other via the IP network. The call control and management information processing apparatus comprises: a storage storing IP addresses of the first and second IP telephones and of the first and second information processing devices in association with first and second user identifiers of the first and second IP telephones, respectively; a unit responsive to receipt of the second user identifier of the second IP telephone from the first IP telephone, for sending, based on the first and second user identifiers to the second IP telephone using the IP address of the second IP telephone, a message requesting for establishment of a session between the second IP telephone and the first IP telephone to thereby establish a session between the first and second IP telephones; and a unit for sending the IP address of the second information processing device to the first information processing device using the IP address of the first information processing device and sending the IP address of the first information processing device to the second information processing device using the IP address of the second information processing device, when a session is established between the first IP telephone and the second IP telephone.

The invention also relates to a program recorded on a recording medium and a method for implementing the call control and management information processing apparatus and the IP telephone described above.

DESCRIPTION OF THE PREFERRED EMBODIMENTS

When IP telephones are connected to each other, it is often convenient to display an image by interconnecting users' personal computers (PCs), for displaying a visual material for example. Once the P2P session has been established between the PCs, both of the users can view a Web page and the same material such as a file created by a particular application while talking over the IP telephones. However, it may be cumbersome for the users to separately operate the PCs to establish a session between the PCs.

The inventors have recognized that it is advantageous to facilitate establishment of the P2P session between information processing devices associated with the IP telephones after a session is established between the IP telephones.

An object of the present invention is to facilitate establishment of a P2P session between information processing devices associated with respective IP telephones after a session is established between the IP telephones over the IP network.

According to the invention, a session between the information processing devices associated with the respective IP telephones can be established at any timing by users or automatically after a session is established between IP telephones over the IP network.

The invention will be described in connection with non-limiting embodiments with reference to the accompanying drawings. Throughout the drawings, similar symbols and numerals indicate similar items and functions.

Figure 1:
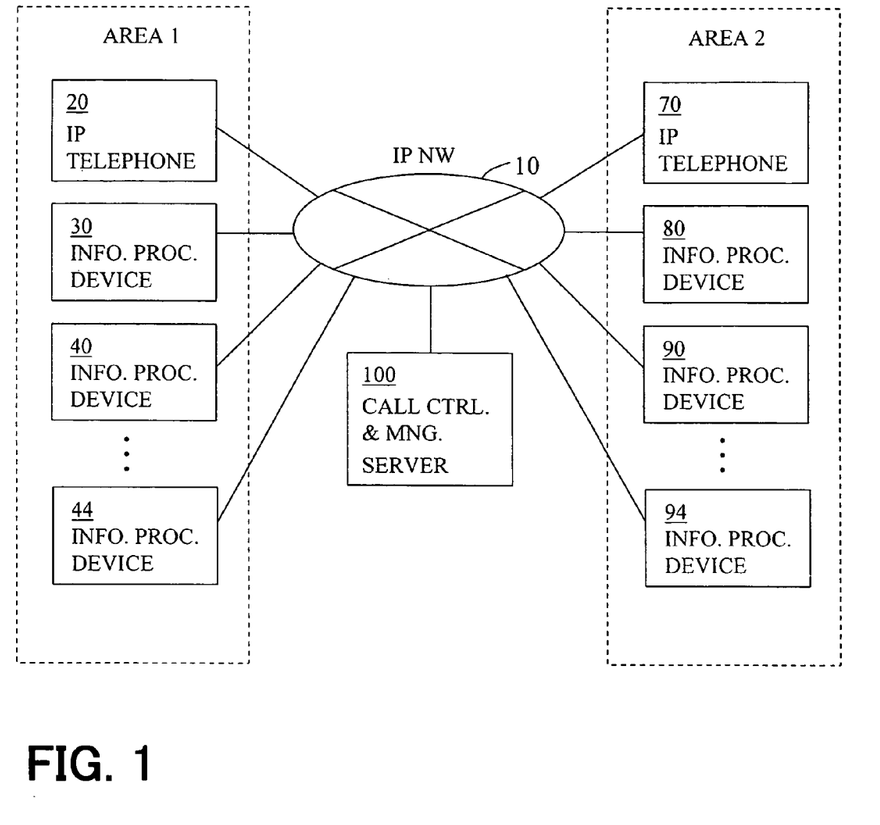
FIG. 1 shows a system in accordance with the present invention, which consists of a call control and management server for controlling and managing calls on an IP network (IP NW), an IP telephone and information processing devices located in one area and connected to the IP network, and another IP telephone and other information processing devices located in another area and connected to the IP network.

FIG. 1 shows a system in accordance with the present invention, which consists of a call control and management server 100 for controlling and managing calls on an IP network (IP NW) 10, an IP telephone 20 and information processing devices 30, 40, . . . 44 located in one area 1 and connected to the IP network 10, and another IP telephone 70 and other information processing devices 80, 90, . . . 94 located in another area 2 and connected to the IP network 10. The IP network 10 is typically the Internet and may include LAN, intranet, ISDN, PSTN, CATV network or the like. Additional IP telephones similar to the IP telephones 20 and 70 may be located in the areas 1 and 2.

Figure 2A:
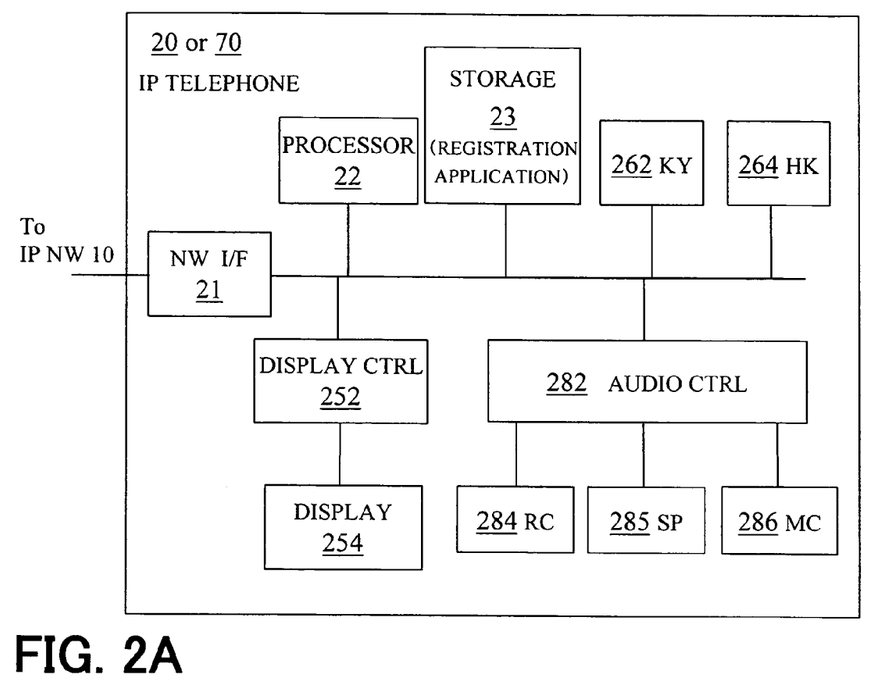
FIGS. 2A and 2B show schematic hardware and software configurations of each of the IP telephones, respectively.
Figure 2B:
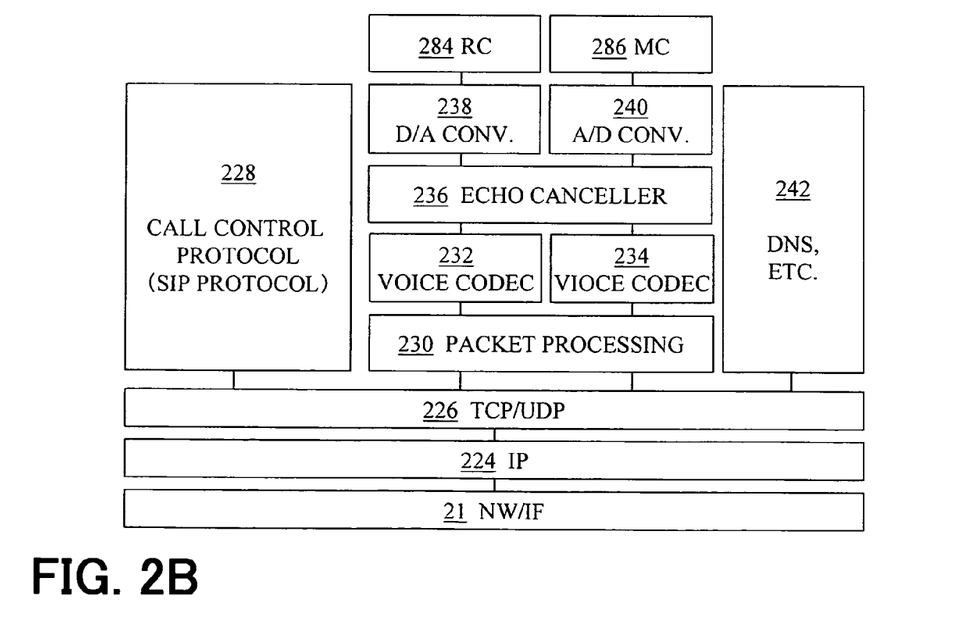

FIGS. 2A and 2B show schematic hardware and software configurations of each of the IP telephones 20 and 70, respectively. In FIG. 2A, each of the IP telephones 20 and 70 includes a network interface (NW I/F) 21, a processor 22, a storage device 23, a display control unit 252 connected to a display device 254, a key (KY) 262, a hook switch (HK) 264, and an audio control unit 282 connected to a receiver (RC) 284, a speaker (SP) 285 and a microphone (MC) 286, in which the elements 21-23 and 252, 262, 264 and 282 are connected to an internal bus. The network interface 21 is also connected to the IP network 10. The processor 22 operates in accordance with a program stored in the storage device 23. In the processor 22, at least a portion of functions of the program may be implemented in the form of hardware. The storage device 23 includes an IP address registration application program for registering IP addresses of the respective information processing devices 30, 40, . . . 44 or the information processing devices 80, 90, . . . 94.

In FIG. 2B, the software for the processor 22 stored in the storage device 23 includes an internet protocol (IP) module 224 for communication with the network interface 21, a TCP/UDP module 226 implemented over the internet protocol module 224, a call control protocol module 228 operating over the TCP/UDP 226, a packet processing unit 230, a voice codec 232 for decoding packets received from the packet processing unit 230, a voice codec 234 for encoding audio signals supplied to the packet processing unit 230, an echo canceller 236, a D/A converter 238 supplying audio signals to the receiver 284, an A/D converter 240 receiving audio signals from the microphone 286, and a DNS (Domain Name System) program, and other programs 242.

Figure 3:
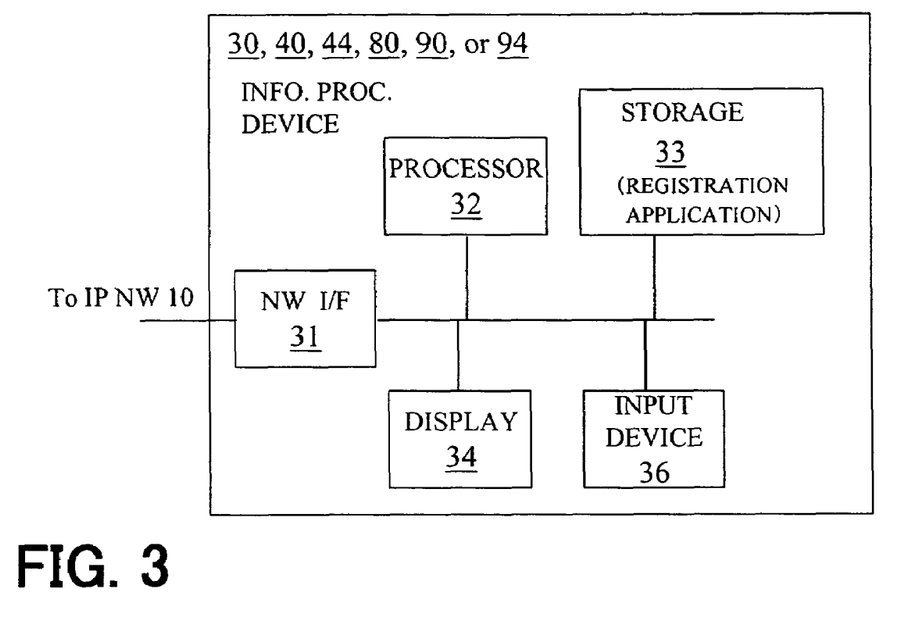
FIG. 3 shows a schematic configuration of each of the information processing devices.

FIG. 3 shows a schematic configuration of each of the information processing devices 30, 40, 44, 80, 90 and 94. Each of the information processing devices 30, 40, 44, 80, 90 and 94 includes a network interface (NW I/F) 31, a processor 32, a storage device 33, a display device 34 and an input device 36, which are connected to an internal bus. The network interface 31 is also connected to the IP network 10. The processor 32 operates in accordance with programs stored in the storage device 33. The programs also include an application program for the P2P communication, and may further include an IP address registration application program for providing IP addresses of ones of the information processing devices 30 to 44 or 80 to 94 to an associated one of the IP telephones 20 or 70. At least a portion of functions of the programs may be implemented in the form of hardware in the processor 32. The information processing devices 30 to 44 and 80 to 94 may be personal computers (PCs) or PDAs (Personal Digital Assistants).

Figure 4:
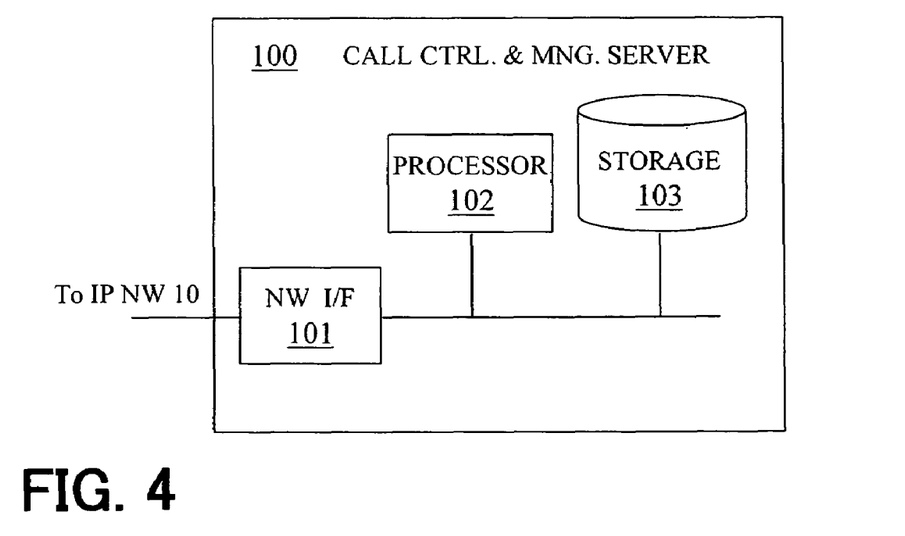
FIG. 4 shows a schematic configuration of the call control and management server.

FIG. 4 shows a schematic configuration of the call control and management server 100. The call control and management server 100 includes a network interface (NW I/F) 101, a processor 102 and a storage device 103, which are connected to an internal bus. The network interface 31 is also connected to IP network 10. The processor 102 operates in accordance with a program for call control and management stored in the storage device 103. At least a portion of functions of the program may be implemented in the form of hardware in the processor 102. In this embodiment, the SIP protocol is used as the call control protocol.

When each of the IP telephones 20 and 70 is connected to the IP network 10, the processor 22 thereof performs operations for registering the IP address of the IP telephone 20 or 70 and also registering the IP address of each of the information processing devices 30 to 44 or 80 to 94 with the call control and management server 100.

Figure 5A:
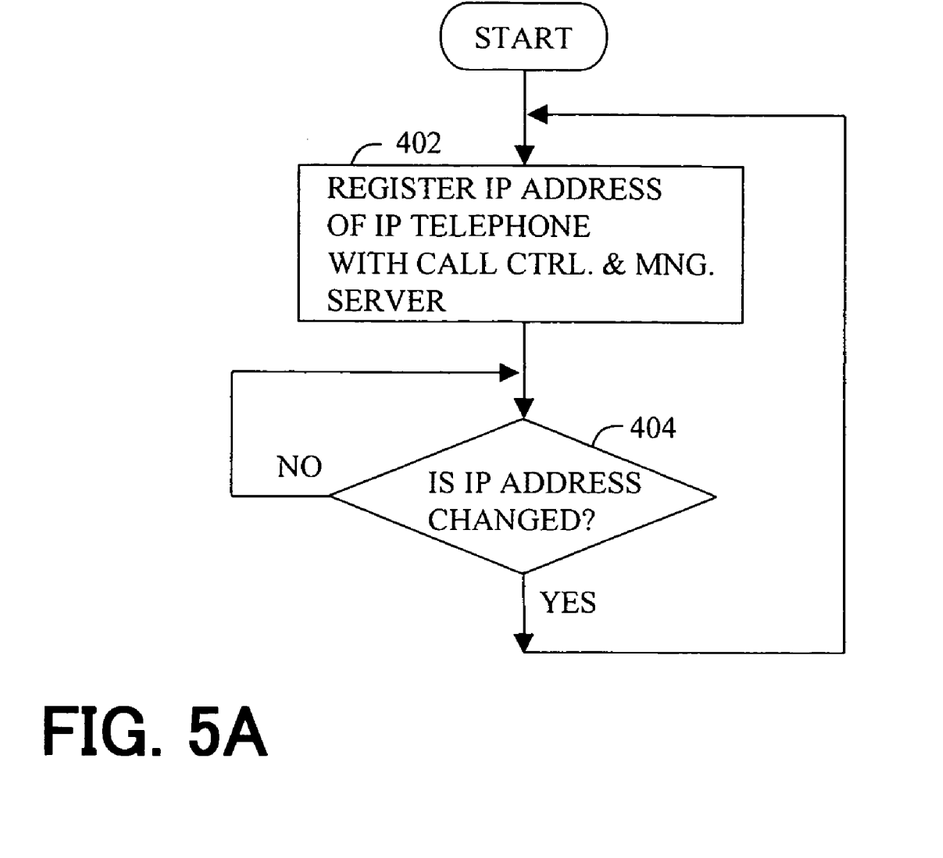
FIGS. 5A and 5B show flow charts for registering the IP addresses of the IP telephone and the associated information processing devices, which is executed by the processor the IP telephone.
Figure 5B:
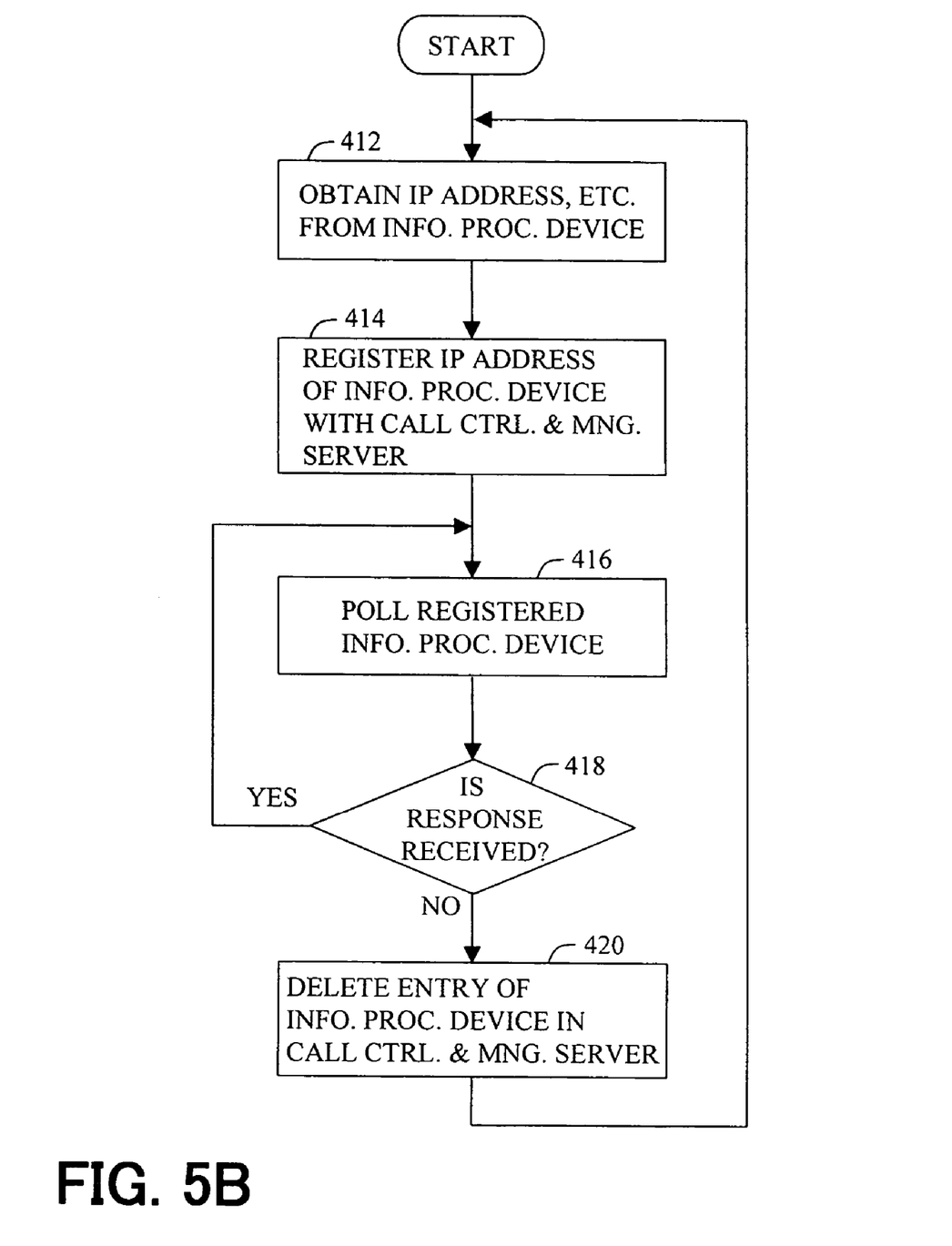

FIGS. 5A and 5B show flow charts for registering the IP addresses of the IP telephone 20 or 70 and the associated information processing devices 30 to 44 or 80 to 94, which is executed by the processor 22 of each of the IP telephones 20 and 70.

Referring to FIG. 5A, at Step 402, when the keys (262) for the registration are operated by a user, the processor 22 of the IP telephone 20 or 70 connects that IP telephone to the call control and management server 100 via the IP network 10 and registers or updates the IP address (e.g., 10.10.10.1) and the like of that IP telephone with or in the call control and management server 100. The processor 102 of the call control and management server 100 stores or updates a registration or registered name, the IP address and the like of the IP telephone as a user identifier in a registration table in the storage device 103. After that, the processor 22 at Step 404 determines whether or not the IP address of the IP telephone 20 or 70 is updated. Step 404 is repeated until the IP address is updated. If it is determined that the IP address is changed at Step 404, the procedure proceeds to Step 402. In this way, when the IP addresses of the IP telephones 20 and 70 are updated, entries in the registration table for the IP telephones 20 and 70 are also updated in the call control and management server 100.

Each of the IP telephones 20 and 70 registers the IP addresses and the like of the information processing devices 30 to 44 or 80 to 94 with the call control and management server 100, as described below.

Referring to FIG. 5B, when the keys (262) for the registration are operated by a user, the processor 22 of each of the IP telephones 20 and 70 activates, in response to the key input, the registration application program (242) for registering the IP addresses of the respective information processing devices 30 to 44 or 80 to 94, prompts the user to input information such as their IP addresses, and stores the IP addresses in the storage device 23.

Alternatively, both of the IP telephone 20 or 70 and the respective information processing devices 30 to 44 or 80 to 94 may activate registration application programs, so that, when the keys (36) for the registration are operated by a user or when each of the information processing devices 30 to 44 or 80 to 94 is activated by the user, the processor 32 of each of the information processing devices 30 to 44 or 80 to 94 at Step 412 may connect to the IP telephone 20 or 70 using of the IP address of the IP telephone 20 or 70 (e.g., 10.10.10.1 or 20.20.20.1) in response to the key input or the activation, and send the IP address of that information processing device (30 to 44 or 80 to 94) (e.g., 10.10.10.1 or 20.20.20.1) to the IP telephone 20 or 70. The IP address of the IP telephone 20 or 70 may be pre-stored in the storage device 23, or obtained by activating the ARP protocol with the MAC addresses of the IP telephone 20 or 70 pre-stored in the storage device 23. Thus, the processor 22 stores the IP addresses into the storage device 23.

The information registered with the call control and management server 100 is not limited to the IP addresses described above, and includes property information, such as types of the information processing devices 30 to 44 and 80 to 94 (e.g., PC and PDA), identifications of available applications (e.g., App1 and App2) and display resolutions (e.g., 800×600 (SVGA), 1024×768 (XGA), 320×240 (QVGA) and 480×640 (VGA)). The available application may be a known application which has functions, for example, for transferring information displayed on a display device of one information processing device to another information processing device for displaying, and for displaying, on the display device of the one information processing device, information received from the other information processing device. Alternatively, it may be a known application which has functions, for example, for temporarily establishing a P2P session between the information processing devices to share a file between them. The registered information may further include determination conditions for determining as to whether or not a session is to be established between the information processing devices associated with the respective calling and called IP telephones at the time of establishing the IP telephone call. These determination conditions may be, for example, "a session is not established if another information processing device to communicate with is other than a PC" and "a session is not established if the display resolution of another information processing device to communicate with is 800×600 or less".

At Step 414, the processor 22 of the IP telephone 20 or 70 connects the IP telephone 20 or 70 to the call control and management server 100 via the IP network 10, and registers, with call control and management server 100, the IP addresses of the associated information processing devices 30 to 44 or 90 to 94 (e.g., 10.10.10.2 or 20.20.20.2) in association with the registered name (e.g., IPtel-1) as the user identifier and the IP address (e.g., 10.10.10.1) of the IP telephone 20 or 70. The processor 102 of the call control and management server 100 stores or updates the IP addresses, the device types, and the determination conditions and priorities (e.g., 1, 2, 3) for the information processing devices 30 to 44 or 80 to 94 in association with the registered name of the IP telephone 20 or 70 received from the IP telephone 20 or 70, in the registration table in the storage device 103.

Figure 7:
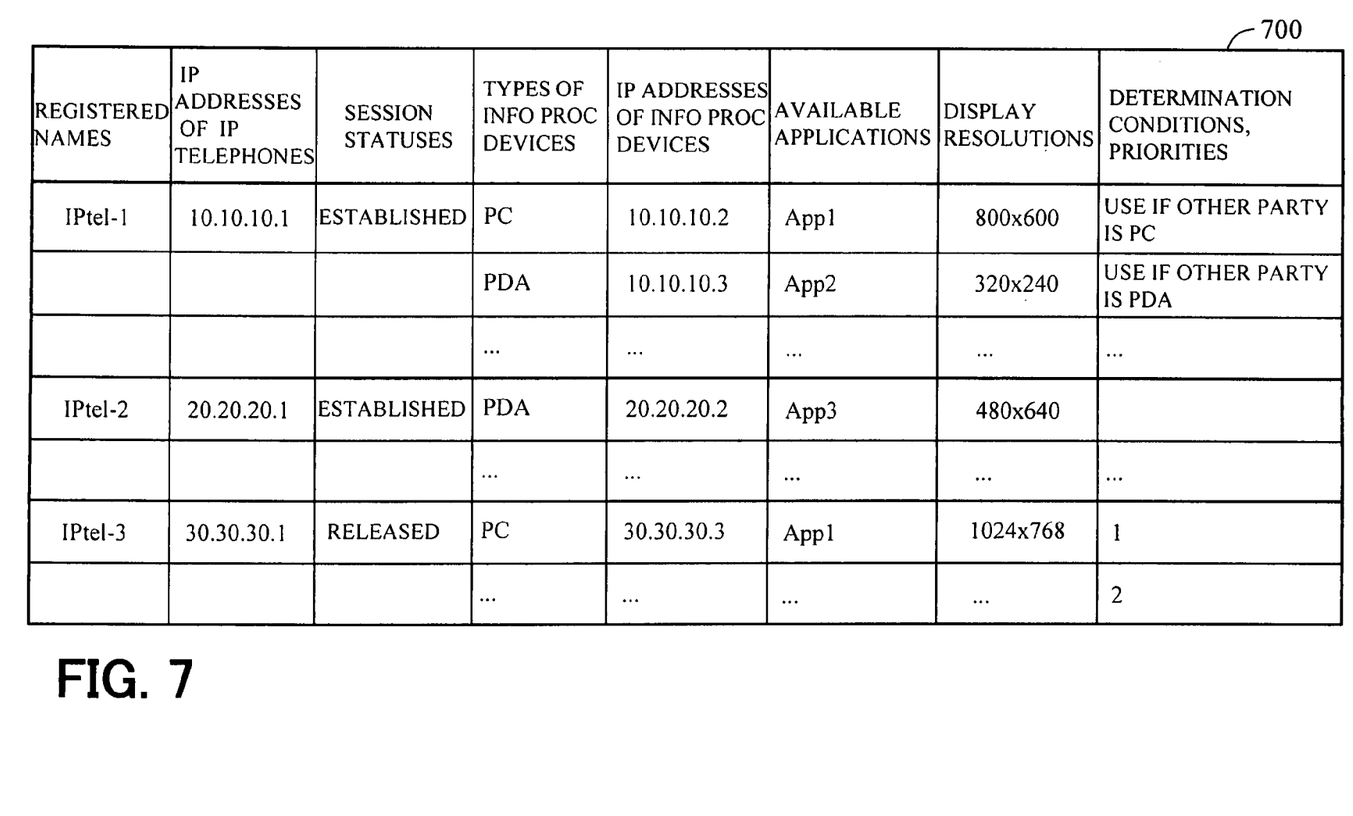
FIG. 7 shows an example of a registration table in the call control and management server which is registered by the IP telephones.

FIG. 7 shows an example of the registration table 700 in the call control and management server 100 which is registered by the IP telephones 20, 70 and the like.

Information stored in the registration table 700 in the call control and management server 100 is the IP addresses and other information obtained by the processor 22 of each of the IP telephones 20 and 70 at Step 412 of FIG. 5B. The processor 22 of the IP telephone 20 or 70 can also register the information related to the information processing devices 30 to 40 or 80 to 94. If the IP telephone 20 or 70 (the processor 22) registers two or more of the information processing devices 30 to 44 or 80 to 94 with the registration table 700, a determination condition for selecting one of the information processing devices must be also registered. For an entry of the registered name "IPtel-1" in the registration table 700 of the example of FIG. 7, two information processing devices (e.g., 30 and 40), i.e. a PC and a PDA, are registered, and determination conditions are set as "use if the other party is PC" and "use if the other party is PDA", respectively. The call control and management server 100 (the processor 102) applies these determination conditions to select one of the information processing devices (e.g., 40) to establish a session with another information processing device (e.g., 80) of the other party to communicate with.

After that, at Step 416, the processor 22 connects the IP telephone 20 or 70 via the IP network 10 and polls the registered information processing devices 30 to 44 or 70 to 94 one after another using the respective stored IP addresses (20.20.20.2 or 10.10.10.3) periodically, for example, in a cycle of 30 seconds. At Step 418, the processor 22 determines whether or not a response is received from the information processing devices 30 to 44 or 70 to 94. If it is determined that the response is received, the procedure goes back to Step 416.

If it is determined that the response is not received, the processor 22 at Step 420 connects the IP telephone 20 or 70 to the call control and management server 100 via the IP network, and operates to delete the corresponding entry of the information processing device 30 to 44 or 70 to 94 which has not responded, including the IP address, from the registration table 700 in the call control and management server 100. Thus the processor 102 of the call control and management server 100 deletes the entry from the registration table. Then, the procedure goes back to Step 412.

At Step 412, when the IP address of any of the information processing devices 30 to 44 or 80 to 94 is changed, the information processing device 30 to 44 or 80 to 94 (the processor 32) also connects to the IP telephone 20 or 70 using the IP address of the corresponding IP telephone 20 or 70, and sends the changed IP address of the information processing device 30 to 44 or 70 to 94 to the IP telephone 20 or 70, and the processor 22 stores the changed IP address in the storage device 23.

In this way, when any of the information processing devices 30 to 44 or 70 to 94 is deactivated, its entry is deleted from the registration table 700. When the IP address of any of the information processing devices 30 to 44 or 70 to 94 is updated, the entry thereof is also updated in the registration table 700 in the call control and management server 100.

Figure 6:
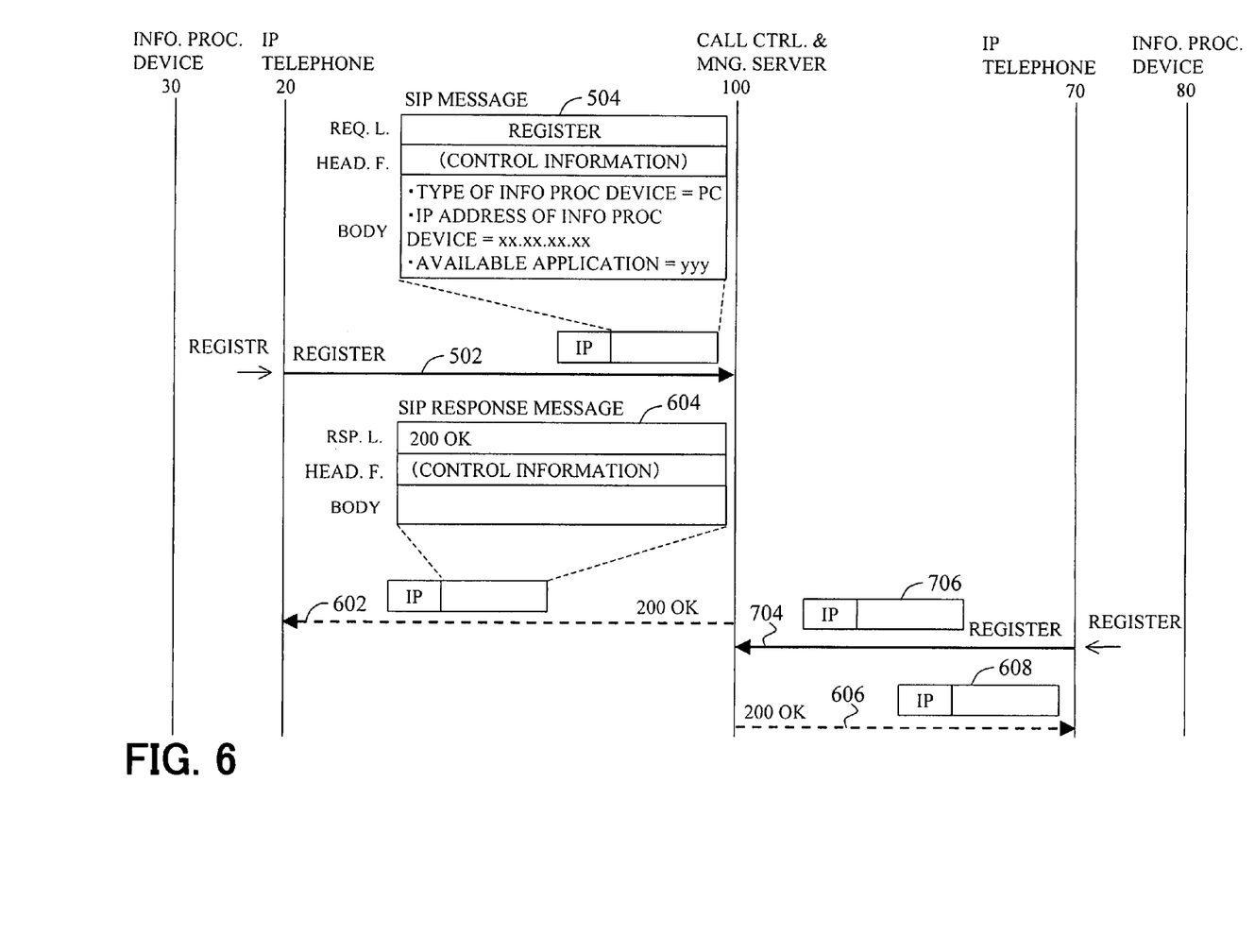
FIG. 6 shows communication procedures between the IP telephones and the call control and management server.

FIG. 6 shows communication procedures between the IP telephones 20 and 70 and the call control and management server 100 developed in Step 414 of FIG. 5B. Upon initiation of the registration of the information processing devices, the IP telephone 20 (the processor 22) in process 502 sends to the call control and management server 100 a SIP message 504 in the text format including the registration items in an IP packet. The SIP message 504 contains "REGISTER" in a request line, predetermined control information in a header field (e.g., SIP URI "sip:IPtel-1@10.10.10.1" containing the registered name and the IP address in a "From" header and a "To" header), and the type of the information processing device (e.g., PC, PDA), the IP address of the information processing device (e.g., 10.10.10.2) and identifiers of available applications (e.g., App1, App12) in a body.

The call control and management server 100 (the processor 102) in process 602 sends back a SIP response message 604 in an IP packet to the IP telephone 20. The SIP response message 604 contains "200 OK" in a response line, the predetermined control information in a header field (e.g., SIP URI "sip:IPtel-1@10.10.10.1" containing the registered name and the IP address in the "From" header and the "To" header) and arbitrary information in a body.

Similarly, for the registration, the IP telephone 70 (the processor 22) in process 704 sends a SIP message 706 to the call control and management server 100. The SIP message 706 contains the same items as the SIP message 504. The call control and management server 100 (the processor 102) in process 606 sends back a SIP response message 608 in an IP packet to the IP telephone 70. The SIP response message 608 contains the same items as the SIP response message 604.

In FIG. 7, the registration table 700 includes entries, including the registered names of the IP telephones 20, 70 and the like, current statuses of sessions of the IP telephones (e.g., established or released), current IP addresses of the IP telephones 20, 70 and the like, the types of the registered information processing devices 30 to 40 and 70 to 94 associated with the IP telephone 20, 70 and the like (e.g., PC or PDA), current IP addresses of the information processing devices 30 to 44 and 70 to 94, applications available in the information processing devices 30 to 44 and 70 to 94, resolutions of displays, and determination conditions and priorities for using the information processing devices 30 to 44 and 70 to 94.

In FIG. 7, for example, the registered name of the IP telephone 20 is "IPtel-1" and the types of the corresponding information processing devices 30 and 40 are PC and PDA, respectively. The IP address of the information processing device 30 is "10.10.10.2". The identification of the available application is "App1". The display resolution is 800×600. The determination condition is "use if the other party is PC". The IP address of the information processing device 40 is "10.10.10.3". The identification of the available application is "App2". The display resolution is 320×240. The determination condition is "use if the other party is PDA".

Figure 8A:
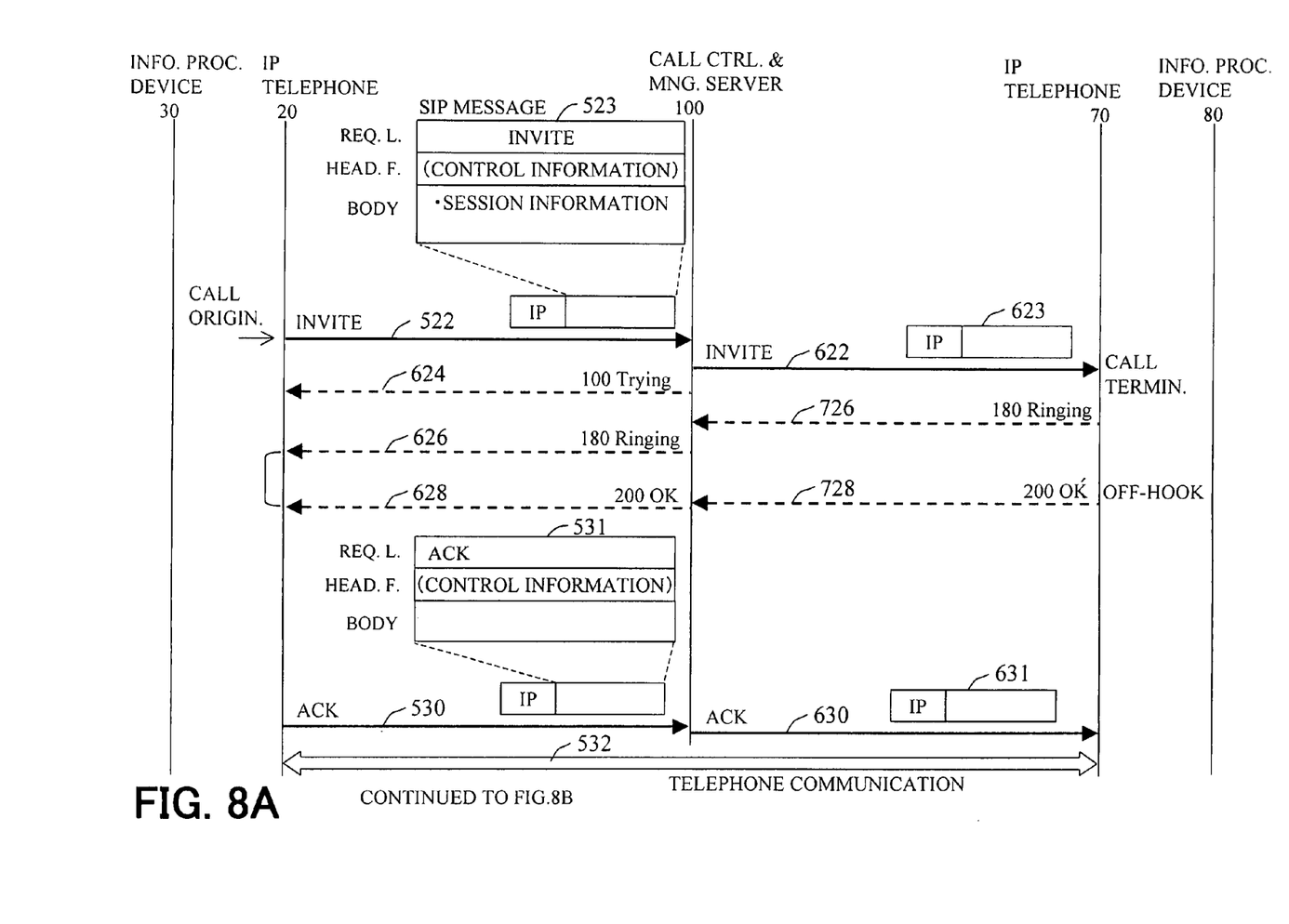
FIGS. 8A and 8B show communication procedures for causing the IP telephone to call the other IP telephone over the IP network and for subsequently causing the information processing devices associated with the IP telephones to connect to each other.
Figure 8B:
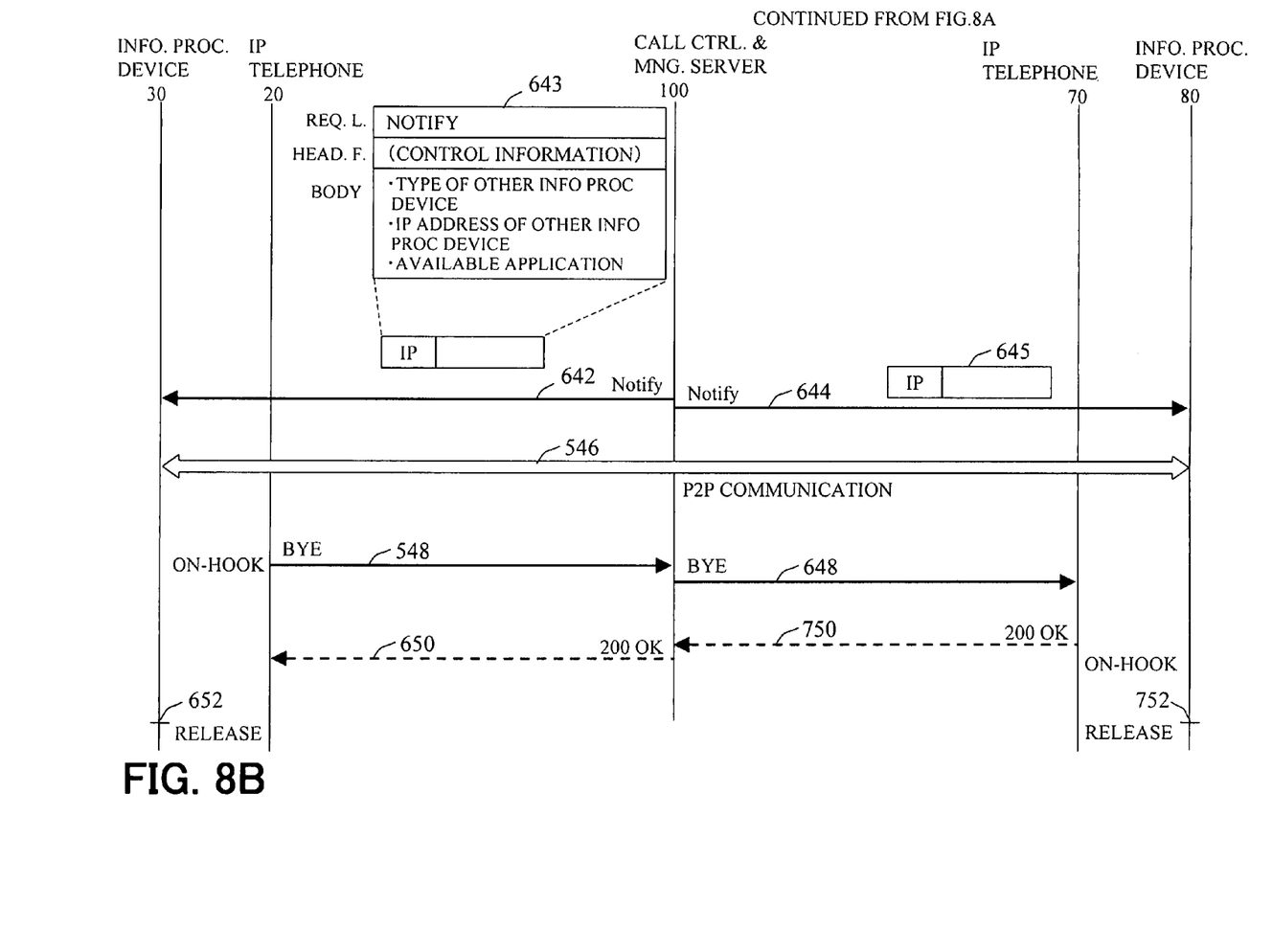

FIGS. 8A and 8B show communication procedures for causing the IP telephone 20 to call the other IP telephone 70 over the IP network 10 and for subsequently causing the information processing devices 30 and 80 associated with the IP telephones to connect to each other.

Figure 9:
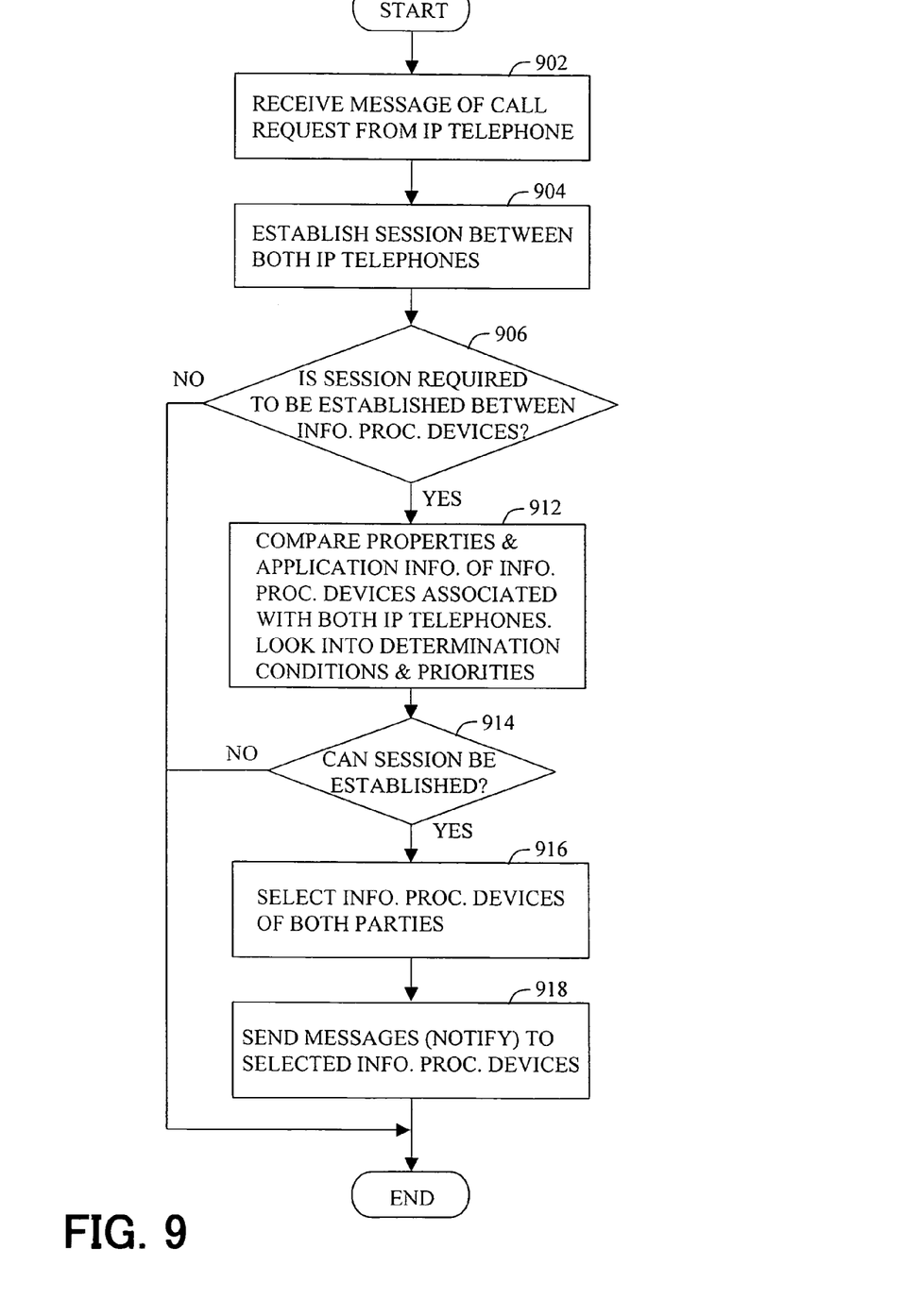
FIG. 9 shows a flow chart for establishing a session between the two IP telephones and subsequently establishing a session between the information processing devices associated with the IP telephones, which is executed by the processor of the call control and management server.

FIG. 9 shows a flow chart for establishing a session between the IP telephones 20 and 70 and subsequently establishing a session between the information processing devices associated with the IP telephones 20 and 70, which is executed by the processor 102 of the call control and management server 100.

In FIG. 8A, a user originates a call to the IP telephone 70 by taking the IP telephone 20 off the hook and entering the registered name (e.g., IPtel-2) of the called IP telephone 70. In process 522, the processor 22 of the IP telephone 20 converts the registered name into a SIP URI (e.g., sip:IPtel-2@20.20.20.1) and sends to the call control and management server 100 an IP packet of a SIP message 523 containing the SIP URI in the "To" header of the header field in a known manner. The SIP message 523 contains "INVITE" indicating a call request in the request line, predetermined control information in the header field containing SIP URI's in the "From" header and the "To" header respectively, and session information in the body describing a data format and the like. When an IP telephone number (e.g., 050-88888888) is inputted as a user identifier of the called IP telephone 70 by the user, the IP telephone 20 may obtain the corresponding registered name via an ENUM server (not shown) on the IP network 10. Alternatively, when the call control and management server 100 receives the SIP message containing the IP telephone number of the called IP telephone 70 in the header field, the call control and management server 100 may obtain the corresponding registered name via an ENUM server (not shown) on the IP network 10.

If a session is not required to be established between the information processing devices during the IP telephone communication, the call origination may be initiated with information indicating "session is not established" added in the body. For this purpose, for example, when the user 262 presses keys representing "session is not established" among the keys 262, the processor 22 may issue a SIP message containing information indicating "session is not established".

Referring to FIG. 9, the processor 102 of the call control and management server 100 at Step 902 receives, from the IP telephone 20, a call request for calling the IP telephone 70, and at Step 904 establishes a call session between the IP telephones 20 and 70. For this purpose, the processor 102 of the call control and management server 100 extracts the registered name (e.g., IPtel-2) from the SIP URL in the SIP message 523 and searches the registration table 700 for the registered name as an index to identify and retrieve the entry of the destination IP telephone 70.

Referring to FIG. 8A, the call control and management server 100 (the processor 102) in process 622 sends a SIP message 623 to the IP telephone 70 with its SIP URI. The SIP message 623 contains the same items as the SIP message 523. The call is terminated, i.e., the IP telephone 70 (the processor 22) receives the incoming SIP message 523, and generates ringing or a beep sound through the speaker 285 in response to the receipt. The call control and management server 100 (the processor 102) in process 624 sends back to the IP telephone 20 a SIP message indicating that the call request is processed (containing "100 Trying" in a status line).

In process 726, in response to the call termination, the IP telephone 70 (the processor 22) sends back to the call control and management server 100 a SIP message (180 Ringing) indicating that the ringing is occurring. In process 626, in response to the receipt of the SIP message (180 Ringing), the call control and management server 100 (the processor 102) sends to the IP telephone 20 a SIP message (180 Ringing) indicating that ringing is occurring. In response to the receipt of the SIP message (180 Ringing), the IP telephone 20 (the processor 22) continues to generate the ringing sound through the speaker 285 until the IP telephone 70 goes off-hook.

When the user of the IP telephone 70 takes the IP telephone 70 off the hook, the IP telephone 70 (the processor 22) in process 728 sends to the call control and management server a SIP message (200 OK) indicating the off-hook. Similarly to the process for the call origination, if a session is not required to be established between the information processing devices during the telephone communication, the body of the message may contain information indicating "session is not established". In response to the receipt of the SIP message (200 OK), the call control and management server 100 (the processor 102) in process 628 sends to the IP telephone 20 a SIP message (200 OK) indicating the off-hook.

In response to the receipt of the SIP message (200 OK) indicating the off-hook, the IP telephone 20 (the processor 22) in process 530 sends to the call control and management server 100 a SIP message (ACK) 531 indicating acknowledgement. Thus the IP telephone 20 enters a status of telephone communication. In response to the receipt of the SIP message, the call control and management server 100 (the processor 102) in process 630 sends to the IP telephone 70 a SIP message (ACK) 631 indicating acknowledgement. Thus the IP telephone 70 also enters a status of telephone communication. Each of the SIP messages 531 and 631 contains ACK in the request line. Subsequently, a telephone communication is established between the IP telephones 20 and 70 in process 532.

Referring to FIG. 9, when each of the IP telephones 20 and 70 are in a status of telephone communication in process 532, the processor 102 of the call control and management server 100 at Step 906 determines whether or not a session is required to be established between the information processing devices associated with both of the IP telephones. If it is determined that it is not required, the procedure exits from this routine. For example, when it receives the SIP message "session is not established" from the calling IP telephone 20 or the called IP telephone 70, none of the IP addresses of the associated information processing devices is sent to the other information processing device.

If it is determined at Step 960 that the session is required to be established, the processor 102 of the call control and management server 100 looks into the registration table 700 to select two of the information processing devices 30 to 44 and 80 to 94 to be used that are associated with the respective IP telephones 20 and 70 in accordance with the predetermined determination conditions and/or priorities.

For example, if a determination condition of "a session is not established if the display resolution of the other information processing device is 800×600 or less" is set as the determination condition to the entry of either of the calling and called parties and if the other information processing device is a PDA with a display resolution of 320×240, the IP address is sent to neither of the information processing devices of the both parties. Common determination criteria may be provided in the call control and management server 100. For example, a determination condition of "a session is not established if a common application is not implemented on the information processing devices of the both parties" may be set as a common control condition in the call control and management server 100. In this case, if a common application is not implemented on the information processing devices of the both parties, the call control and management server 100 does not transfer the IP addresses.

Referring to FIG. 9, at Step 912, the processor 102 of the call control and management server 100 looks into the registration table 700, compares properties and information related to available applications of the information processing devices 30 to 44 and 80 to 94 associated with both of the IP telephones 20 and 70 which have established the telephone communication session, and looks into the determination conditions and priorities. At Step 914, in accordance with the resultant comparison and the determination conditions and priorities, the processor 102 determines whether there is an appropriate combination of two from the information processing devices 30 to 40 and 80 to 94 that can establish a session between the two devices. If it is determined that a communication session cannot be established, the procedure exits from this routine.

If it is determined at Step 914 that a communication session can be established, the processor 102 at Step 916 selects a best combination of two from the information processing devices 30 to 44 and 80 to 94 that can establish a session, in accordance with the determination conditions and priorities. For example, the information processing devices 40 and 80 which are PDAs are selected. At Step 918, the processor 102 sends a SIP message (NOTIFY) to the selected information processing devices 30 and 80.

Referring to FIG. 8B, the call control and management server 100 (the processor 102) in processes 642 and 644 sends SIP messages (Notify) 643 and 645 indicating the notification to the selected information processing devices 30 and 80 with the IP addresses of the respective information processing devices 30 and 80. The SIP message 643 contains "NOTIFY" in the request line, predetermined control information in the header field, and the type, the IP address and the available application identifier of the other information processing device (80) in the body. The SIP message 645 contains the same items as the SIP message 643, especially the information related to the other information processing device (30).

When both of the information processing devices 30 and 80 (the processor 22) receive the respective SIP messages (Notify) 643 and 645, each information processing device can obtain the IP address of the other information processing device. Since the IP address of the other information processing device becomes known in this way, the user can establish a P2P connection with the other party, i.e., between the two information processing devices, at any time.

In accordance with the operation of the user, the information processing device 30 or 80 (the processor 32) in process 546 uses the application (e.g., App2) to send a data file of image information or the like to the application (e.g., App3) in the other information processing device 80 or 30 at its IP address. In this way, a peer-to-peer (P2P) communication session is established between the information processing devices 30 and 80 in process 456.

Alternatively, when the information processing device 30 or 80 (the processor 32) receives the IP address of the other information processing device 80 or 30, it may activate the available application (e.g., App2) and automatically send a data file of image information or the like to the application (e.g., App3) in the other information processing device 80 or 30 at its IP address, independently of an instruction from the user.

After that, if either one of the IP telephones 20 and 70, for example, the IP telephone 20 is caused by the user to go on-hook, the IP telephone 20 (the processor 22) in process 548 sends to the call control and management server 100 a SIPmessage (BYE) representing a notification of the end of the session. In response to receipt of the SIP message (BYE), the call control and management server 100 (the processor 102) sets a session status of the IP telephone 20 in the registration table 700 into the released status, and sends a SIP message (BYE) to the IP telephone 70 in process 648. In response to receipt of the SIP message (BYE), the IP telephone 70 (the processor 22) generates through the receiver 284 a sound indicating that the call is released, and sends to the call control and management server 100 a SIP message (200 OK) indicating acknowledgment in process 750. In response to receipt of the SIP message (200 OK), the call control and management server 100 (the processor 102) sets a session status of the IP telephone 70 in the registration table 700 to the released status, and sends a SIP message (200 OK) to the IP telephone 20 in process 650. In response to receipt of the SIP message (200 OK), the IP telephone 20 (the processor 22) sets the IP telephone 20 to the released status.

After a session is established, the processor 32 of each of the information processing devices 30 and 80 releases the session in accordance with the operation of the user at any time.

Although the invention has been described above in connection with the IP telephone call between the two users, it will be apparent that the invention is also applicable to a three-party telephone service or a conference telephone service using the IP telephones.

The above-described embodiments are only typical examples, and their combination, modifications and variations are apparent to those skilled in the art. It should be noted that those skilled in the art can make various modifications to the above-described embodiments without departing from the principle of the invention and the accompanying claims.

What is claimed is:

1. A system comprising:
    a call control and management information processing apparatus, and first and second IP telephones, which are operable to connect to an IP network; wherein
    a first set of information processing devices is associated with said first IP telephone,
    a second set of information processing devices is associated with said second IP telephone, wherein
    said call control and management information processing apparatus stores IP addresses registered by said first and second IP telephones,
    when each information processing device of the first set of information processing devices is connected to said first IP telephone, said first IP telephone obtains an IP address of each information processing device from each information processing device and sends the IP address of each information processing device with a first IP address of said first IP telephone to said call control and management information processing apparatus, wherein the IP address of each information processing device is registered with said call control and management information processing apparatus,
    when each information processing device of the second set of information processing devices is connected to said second IP telephone, said second IP telephone obtains an IP address of each information processing device from each information processing device and sends the IP address of each information processing device with a second IP address of said second IP telephone to said call control and management information processing apparatus, wherein the IP address of each information processing device is registered with said call control and management information processing apparatus,
    when said call control and management information processing apparatus receives from said first IP telephone a message requesting to establish a session with said second IP telephone, said call control and management information processing apparatus sends, to said second IP telephone using the second IP address of said second IP telephone, a message requesting to establish the session with said first IP telephone, to thereby establish the session between said first and second IP telephones,
    when the session is established between said first and second IP telephones, said call control and management information processing apparatus sends a third IP address of a first information processing device of the first set of information processing devices to a second information processing device of the second set of information processing devices using a fourth IP address of said second information processing device and sends the fourth IP address of said second information processing device to said first information processing device using the third IP address of said first information processing device; and
    when said first information processing device receives, from said call control and management information processing apparatus, the fourth IP address of said second information processing device, another peer-to-peer session is established between said first information processing device and said second information processing device using the fourth IP address of said second information processing device.

2. A system according to claim 1, wherein, after said first information processing device receives the fourth IP address of said second information processing device, said first information processing device establishes the another peer-to-peer session with said second information processing device in accordance with a user operation using the fourth IP address of said second information processing device.

3. A system according to claim 2, wherein said first IP telephone periodically connects to said first information processing device.

4. A system according claim 3, wherein
    when said first information processing device connects to said first IP telephone, said first IP telephone obtains the third IP address of said first information processing device from said first information processing device and sends the third IP address of said first information processing device to said call control and management information processing apparatus, which stores the third IP address of said first information processing device, and when said second information processing device connects to said second P telephone, said second P telephone obtains the fourth IP address of said second information processing device from said second information processing device and sends the fourth IP address of said second information processing device to said call control and management information processing apparatus, which stores the fourth IP address of said of said second information processing device.

5. A system according claim 2, wherein when said first information processing device connects to said first IP telephone, said first IP telephone obtains the third IP address of said first information processing device from said first information processing device and sends the third IP address of said first information processing device to said call control and management information processing apparatus, which stores the third IP address of said first information processing device, and when said second information processing device connects to said second IP telephone, said second IP telephone obtains the fourth IP address of said second information processing device from said second information processing device and sends the fourth IP address of said second information processing device to said call control and management information processing apparatus, which stores the fourth IP address of said second information processing device.

6. A system according to claim 1, wherein said first IP telephone periodically connects to said first information processing device.

7. A system according claim 6, wherein when said first information processing device connects to said first P telephone, said first IP telephone obtains the third IP address of said first information processing device from said first information processing device and sends the third IP address of said first information processing device to said call control and management information processing apparatus, which stores the third P address of said first information processing device, and when said second information processing device connects to said second P telephone, said second P telephone obtains the fourth IP address of said second information processing device from said second information processing device and sends the fourth IP address of said second information processing device to said call control and management information processing apparatus, which stores the fourth IP address of said second information processing device.

8. A system according claim 1, wherein when said first information processing device connects to said first P telephone, said first IP telephone obtains the third IP address of said first information processing device from said first information processing device and sends the third IP address of said first information processing device to said call control and management information processing apparatus, which stores the third IP address of said first information processing device, and when said second information processing device connects to said second IP telephone, said second IP telephone obtains the fourth IP address of said second information processing device from said second information processing device and sends the fourth IP address of said second information processing device to said call control and management information processing apparatus, which stores the fourth IP address of said second information processing device.

9. An IP telephone operable to connect to an IP network, comprising:

a unit, in response to receipt of an input of an instruction for registering a first IP address of a first information processing device associated with said IP telephone, for obtaining the first IP address of the first information processing device associated with said IP telephone;

a connection unit for connecting via the IP network to a call control and management information processing apparatus and sending, to the call control and management information processing apparatus, the first IP address of the first information processing device to thereby register, with the call control and management information processing apparatus, the first IP address of the first information processing device in association with a user identifier and a second IP address of said IP telephone, wherein:

when said first IP telephone sends, using a third IP address of a second IP telephone, a message requesting to establish a session with the second IP telephone to the call control and management information processing apparatus, the session between said first IP telephone and the second IP telephone is established by the call control and management information processing apparatus, and when the session is established between said first IP telephone and the second IP telephone, a fourth IP address of a second information processing device is sent by the call control and management information processing apparatus to the first information processing device using the first IP address of the first information processing device and another peer-to-peer session is established by the first information processing device with the second information processing device using the fourth IP address of the second information processing device.

10. A call control and management information processing apparatus comprising:

a storage storing IP addresses of a first IP telephone and a first set of information processing devices, said IP addresses being registered by the first IP telephone, in association with a first user identifier of the first IP telephone, and storing other IP addresses of a second IP telephone and a second set of information processing devices, said other IP addresses being registered by the second IP telephone, in association with a second user identifier of the second IP telephone;

a unit responsive to receipt of the second user identifier of the second IP telephone from the first IP telephone for sending, based on the first and second user identifiers, to the second IP telephone using the IP address of the second IP telephone a message requesting for establishment of a session between the second IP telephone and the first IP telephone to thereby establish the session between the first and second IP telephones via an IP network; and a unit for sending, via the IP network, a first IP address of a first information processing device of the first set of information processing devices to a second information processing device of the second set of information processing devices using a second IP address of the second information processing device and sending, via the IP network, the second IP address of the second information processing device to the first information processing device using the first IP address of the first information processing device, wherein another session is established between the first and second information processing devices, when the session is established between the first and second IP telephones.

11. An information processing apparatus comprising:
a storage storing IP addresses of a first IP telephone and a first set of information processing devices, said IP addresses being registered by the first IP telephone, in association with a first user identifier of the first IP telephone, and storing other IP addresses of a second IP telephone and a second set of information processing devices, said other IP addresses being registered by the second IP telephone, in association with a second user identifier of the second IP telephone, and storing a determination condition for determining if a first session can be established between a first information processing device of the first set of information processing devices and a second information processing device of the second set of information processing devices;
a unit responsive to receipt of the second user identifier of the second IP telephone from the first IP telephone, for sending, based on the first and second user identifiers, to the second IP telephone using the IP address of the second IP telephone a message requesting for establishment of a second session between the second IP telephone and the first IP telephone to thereby establish the second session between the first and second IP telephones via an IP network;
a determination unit for determining, in accordance with the determination condition, whether the first session can be established between the first and second information processing devices, when the second session is established between the first and second IP telephones; and
a unit for sending, via the IP network, a first IP address of the first information processing device to the second information processing device using a second IP address of the second information processing device and sending, via the IP network, the second IP address of the second information processing device to the first information processing device using the first IP address of the first information processing device, wherein the first session is established between the first and second information processing devices, when the determination unit determines that the first session can be established between the first and second information processing devices.

12. A computer-readable storage medium storing a program for causing a computer to perform as a call control and management information processing apparatus operable to connect to an IP network, said program comprising the steps of:
storing, in a storage, IP addresses of a first IP telephone and a first set of information processing devices, said IP addresses being registered by the first IP telephone, in association with a first user identifier of the first IP telephone, and storing, in the storage, other IP addresses of a second IP telephone and a second set of information processing devices, said other IP addresses being registered by the second IP telephone, in association with a second user identifier of the second IP telephone;
in response to receipt of the second user identifier of the second IP telephone from the first IP telephone, sending, based on the first and second user identifiers, to the second IP telephone using an IP address of the second IP telephone a message requesting for establishment of a session between the second IP telephone and the first IP telephone to thereby establish the session between the first and second IP telephones; and
sending a first IP address of a first information processing device of the first set of information processing devices to a second information processing device of the second set of information processing devices using a second IP address of the second information processing device and sending the second IP address of the second information processing device to the first information processing device using a third IP address of the first information processing device, wherein another session is established between the first and second information processing devices, when the session is established between the first and second IP telephones.

13. A computer-readable storage medium storing a program for causing a computer to perform as a call control and management information processing apparatus operable to connect to an IP network, said program comprising the steps of:
storing, in a storage, IP addresses of a first IP telephone and a first set of information processing devices, said IP addresses being registered by the first IP telephone, in association with a first user identifier of the first IP telephone, and storing, in the storage, other IP addresses of a second IP telephone and a second set of information processing devices, said other IP addresses being registered by the second IP telephone, in association with a second user identifier of the second IP telephone, and further storing, in the storage, a determination condition for determining if a first session can be established between a first information processing device of the first set of information processing devices and a second information processing device of the second set of information processing devices;
in response to receipt of the second user identifier of the second IP telephone from the first IP telephone, sending, based on the first and second user identifiers, to the second IP telephone using the IP address of the second IP telephone a message requesting for establishment of a second session between the second IP telephone and the first IP telephone to thereby establish the second session between the first and second IP telephones;
determining, in accordance with the determination condition, whether the first session can be established between the first and second information processing devices, when the second session is established between the first and second IP telephones; and
sending a first IP address of the first information processing device to the second information processing device using a second IP address of the second information processing device and sending the second IP address of the second information processing device to the first information processing device using the first IP address of the first information processing device, wherein the first session is established between the first and second information processing devices, when it is determined that the first session can be established between the first and second information processing devices.

14. In an IP telephone operable to connect to an IP network, a method for registering, with a call control and management information processing apparatus, an IP address of an information processing device associated with said IP telephone, said method comprising:

receiving an input of an instruction for registering a first IP address of a first information processing device associated with said IP telephone;

obtaining the first IP address of the first information processing device associated with said IP telephone; and connecting via the IP network to a call control and management information processing apparatus and sending, to the call control and management information processing apparatus, the first IP address of the information processing device to thereby register with the call control and management information processing apparatus, the first IP address of the first information processing device in association with a user identifier and a second IP address of said IP telephone, wherein when said IP telephone sends, using a third IP address of a second IP telephone, a message requesting to establish a session with the second IP telephone to the call control and management information processing apparatus, the session between said IP telephone and the second IP telephone is established by the call control and management information processing apparatus, and when the session is established between said IP telephone and the second IP telephone, a fourth IP address of a second information processing device is sent by the call control and management information processing apparatus to the first information processing device using the first IP address of the first information processing device and another peer-to-peer session is established by the first information processing device with the second information processing device using the fourth IP address of the second information processing device.

15. In a call control and management information processing apparatus operable to connect to an IP network, a method for establishing a session between first and second IP telephones via the IP network and establishing another session between an information processing device associated with the first IP telephone and another information processing device associated with the second IP telephone via the IP network, said method comprising:

storing, in a storage, IP addresses of a first IP telephone and a first set of information processing devices, said IP addresses being registered by the first IP telephone, in association with a first user identifier of the first IP telephone, and storing, in the storage, other IP addresses of a second IP telephone and a second set of information processing devices, said other IP addresses being registered by the second IP telephone, in association with a second user identifier of the second IP telephone;

in response to receipt of the second user identifier of the second IP telephone from the first IP telephone, sending, based on the first and second user identifiers, to the second IP telephone using the IP address of the second IP telephone a message requesting for establishment of a session between the second IP telephone and the first IP telephone to thereby establish the session between the first and second IP telephones; and sending a first IP address of a first information processing device associated with the first IP telephone to another information processing device using a second IP address of the another information processing device and sending the second IP address of the another information processing device to the first information processing device associated with the first IP telephone using the first IP address of the first information processing device associated with the first IP telephone, wherein another session is established between the first information processing device and the another information processing device, when the session is established between the first and second IP telephones.

16. In a call control and management information processing apparatus operable to connect to an IP network, a method for establishing a session between a first and second IP telephones via the IP network and establishing another session between a first information processing device of a first set of information processing devices associated with the first IP telephone and a second information processing device of a second set of information processing devices associated with the second IP telephone via the IP network, said method comprising:

storing, in a storage, IP addresses of a first IP telephone and the first set of information processing devices, said IP addresses being registered by the first IP telephone, respectively, in association with a first user identifier of the first IP telephone, and storing, in the storage, other IP addresses of a second IP telephone and the second set of information processing devices, said other IP addresses being registered by the second IP telephone, respectively, in association with a second user identifier of the second IP telephone, and further storing, in the storage, a determination condition for determining if the another session can be established between the first information processing device of the first set of information processing devices and the second information processing device of the second set of information processing devices;

in response to receipt of the second user identifier of the second IP telephone from the first IP telephone, sending, based on the first and second user identifiers, to the second IP telephone using the IP address of the second IP telephone a message requesting for establishment of the session between the second IP telephone and the first IP telephone to thereby establish the session between the first and second IP telephones;

determining, in accordance with the determination condition, whether the another session can be established between the first and second information processing devices, when the session is established between the first and second IP telephones; and sending a first IP address of the first information processing device to the second information processing device using a second IP address of the second information processing device and sending the second IP address of the second information processing device to the first information processing device using the first IP address of the first information processing device associated with the first IP telephone, wherein the another session is established between the first and second information processing devices, when it is determined that the another session can be established between the first and second information processing devices.

* * * * *